US008875815B2

(12) United States Patent
Terrien et al.

(10) Patent No.: US 8,875,815 B2
(45) Date of Patent: Nov. 4, 2014

(54) MOBILE ROBOT

(75) Inventors: Grégoire Terrien, Saint-Sulpice (CH); Huy Hoàng Lê, Lausanne (CH)

(73) Assignee: Bluebotics SA, Lausanne (CH)

( * ) Notice: Subject to any disclaimer, the term of this patent is extended or adjusted under 35 U.S.C. 154(b) by 0 days.

(21) Appl. No.: 14/129,338

(22) PCT Filed: Jun. 29, 2011

(86) PCT No.: PCT/EP2011/060937
§ 371 (c)(1),
(2), (4) Date: Mar. 3, 2014

(87) PCT Pub. No.: WO2013/000514
PCT Pub. Date: Jan. 3, 2013

(65) Prior Publication Data
US 2014/0166377 A1      Jun. 19, 2014

(51) Int. Cl.
*B62D 55/04*  (2006.01)
*B62D 55/075*  (2006.01)
*B62D 55/065*  (2006.01)
*B25J 5/00*  (2006.01)

(52) U.S. Cl.
CPC ............ *B62D 55/075* (2013.01); *B62D 55/065* (2013.01); *Y10S 901/01* (2013.01); *B25J 5/005* (2013.01)
USPC ................. 180/9.3; 180/8.2; 180/65.1; 901/1

(58) Field of Classification Search
CPC .... B62D 55/10; B62D 55/116; B62D 55/075; A61G 5/061
USPC ........................................... 180/9.3, 8.2, 65.1
See application file for complete search history.

(56) References Cited

U.S. PATENT DOCUMENTS 4,977,971 A * 12/1990 Crane et al. ..................... 180/8.3
4,993,912 A    2/1991 King
(Continued)

FOREIGN PATENT DOCUMENTS

JP    2005111595 A    4/2005
WO        8706205 A1    10/1987

OTHER PUBLICATIONS

International Search Report for PCT/EP2011/060937 dated Feb. 28, 2012.
Written Opinion for PCT/EP2011/060937 dated Feb. 28, 2012.

*Primary Examiner* — Joseph M Rocca
*Assistant Examiner* — Marlon Arce
(74) *Attorney, Agent, or Firm* — Pearne & Gordon LLP

(57) ABSTRACT

Mobile robot comprising a body (30), a first locomotion unit (43) and a second locomotion unit (53) pivotally connected to two lateral opposite sides of the body (30) and arranged to rotate passively relative to the body about an axis (31) transverse to the body, the mobile robot further comprising a transmission system (91) connecting said first and second locomotion units (43, 53) and the body (30), characterized in that the mechanical transmission is arranged to limit the relative rotation of the locomotion units (43, 53) relative to the body (30) such that the first and second locomotion units (43, 53) rotate in opposite directions and such that the rotation angle ($\alpha$) of the first locomotion unit (43) relative to the body (39) equates in absolute value the rotation angle ($\beta$) of the second locomotion (53) unit relative to the body (30).

11 Claims, 5 Drawing Sheets

(56) References Cited

U.S. PATENT DOCUMENTS

| | | |
|---|---|---|
| 6,267,196 B1 * | 7/2001 | Wilcox et al. ............... 180/347 |
| 6,662,889 B2 * | 12/2003 | De Fazio et al. ............ 180/22 |
| 6,958,746 B1 * | 10/2005 | Anderson et al. ........... 345/161 |
| 7,011,171 B1 | 3/2006 | Poulter |
| 7,581,605 B2 * | 9/2009 | Caspi et al. ................. 180/9.1 |
| 7,784,570 B2 * | 8/2010 | Couture et al. .............. 180/9.1 |
| 8,157,032 B2 * | 4/2012 | Gettings ..................... 180/9.32 |
| 8,327,960 B2 * | 12/2012 | Couture et al. .............. 180/9.1 |
| 8,397,842 B2 * | 3/2013 | Gettings ..................... 180/9.1 |
| 2002/0023788 A1 | 2/2002 | Terrie et al. |

\* cited by examiner

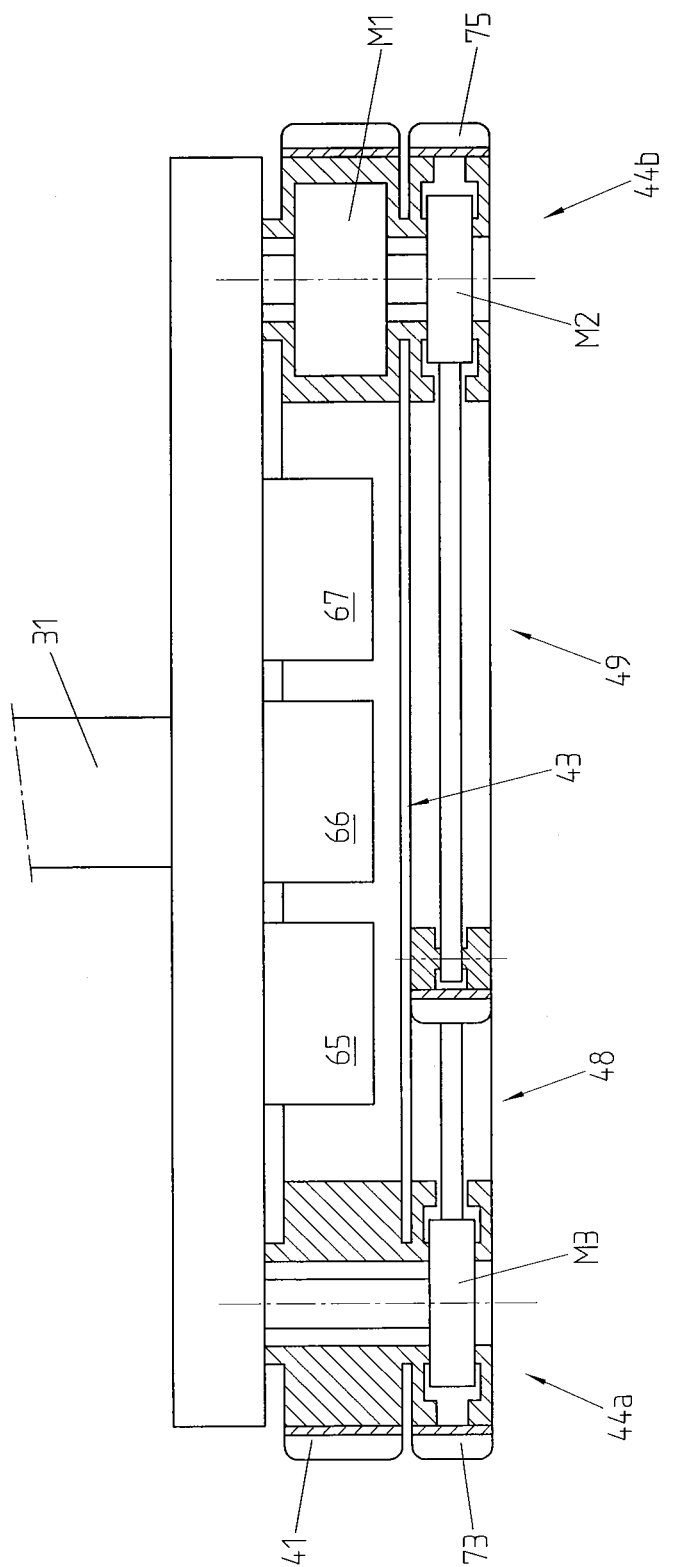

MOBILE ROBOT

FIELD OF THE INVENTION

The present invention concerns a mobile robot platform. In embodiments, the robot platform of the invention is adapted for use in urban search and rescue missions. This is not however a limitation of the invention.

DESCRIPTION OF RELATED ART

Mobile robotic platforms are used in the art for a variety of missions in difficult or dangerous environment, for example in urban search and rescue missions (USAR), for example for conducting physical search in collapsed or damaged buildings, providing relief and a communication link to trapped victims, assess and control hazardous materials or utilities, and so on. Robotic platforms are also used in outdoor application, for example in the military field, in agriculture, in structure surveying, and in a multitude of applications, or for performing maintenance tasks in hazardous environments.

The environment in which these robots must travel is characterized by rugged and unstable terrain, and comprises a variety of difficult situations for a robot, like stairways and steep inclines. In order to adapt to this variety of situation, a number of alternatives have been attempted in the art.

Tracked mobile robots or vehicles are relatively common and examples thereof can be found, among others, in US2004168837, US2011061951, WO10068198. Straight tracks are very effective on flat terrain, and provide excellent grip, but may be unable to negotiate certain obstacles like steps or stairways.

Other documents, including WO2008105948, US2002189871, CN101279618, describe vehicles with adjustable flippers that serve as main locomotion device, or assist a main track or wheel drive. Such systems are in general more flexible than conventional straight tracked vehicles, but are in general harder to control, due to the larger number of degrees of freedom involved.

GB541253 describes a tracked vehicle, provided with detachable auxiliary track units whose inclination is adjustable.

The known locomotion system and robots are limited in their flexibility or are highly complex to control. It is a goal of the present invention to propose a mobile robot that has the ability to cross rugged terrains and to overcome difficult obstacles like stairways without increasing the complexity or making the control more difficult, thus increasing the potential of automation.

BRIEF SUMMARY OF THE INVENTION

According to the invention, these aims are achieved by means of the object of the appended claims, and in particular by a mobile robot comprising a body, a first locomotion unit and a second locomotion unit pivotally connected to two lateral opposite sides of the body and arranged to rotate passively relative to the body about an axis transverse to the body, the mobile robot further comprising a transmission system connecting said first and second locomotion units and the body, characterized in that the mechanical transmission is arranged to limit the relative rotation of the locomotion units relative to the body such that the first and second locomotion units rotate in opposite directions and such that the rotation angle of the first locomotion unit relative to the body equates in absolute value the rotation angle of the second locomotion unit relative to the body.

The robot of the invention presents a favourable automation capability, and can execute large parts of the mission in autonomous mode. The structure of the robot is adapted to difficult and rugged terrains, and eminently suitable for Search and Rescue, or fire fighting, or bomb disposal, or police, or military applications.

BRIEF DESCRIPTION OF THE DRAWINGS

The invention will be better understood with the aid of the description of an embodiment given by way of example and illustrated by the figures, in which:

FIG. 5 is a simplified representation of a section of one bogey along the plane A-A of FIG. 1, showing some of the elements contained therein.

DETAILED DESCRIPTION OF POSSIBLE EMBODIMENTS OF THE INVENTION

When reference is made to the directions "up", "down", "forward", "aft", "left", "right", "horizontal" and so on, it must be intended that these indication are relative to the standard working position of the robot, and to its preferred direction of motion. These are not, in general, limitative features of the invention and are used to simplify the explanation only.

Figure 1:
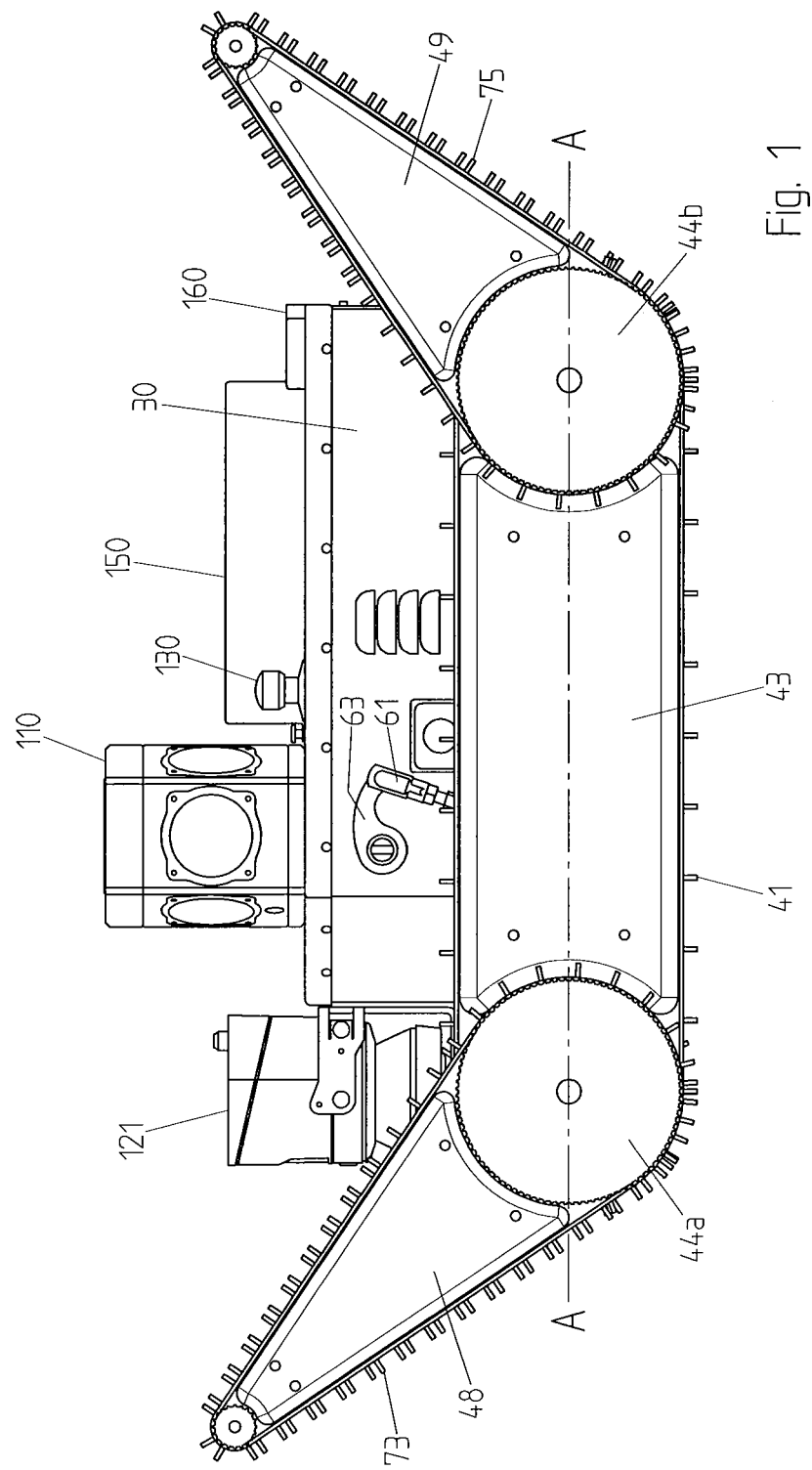
FIG. 1 shows a robot according to one aspect of the intention, seen from the side, on a flat terrain.
Figure 3:
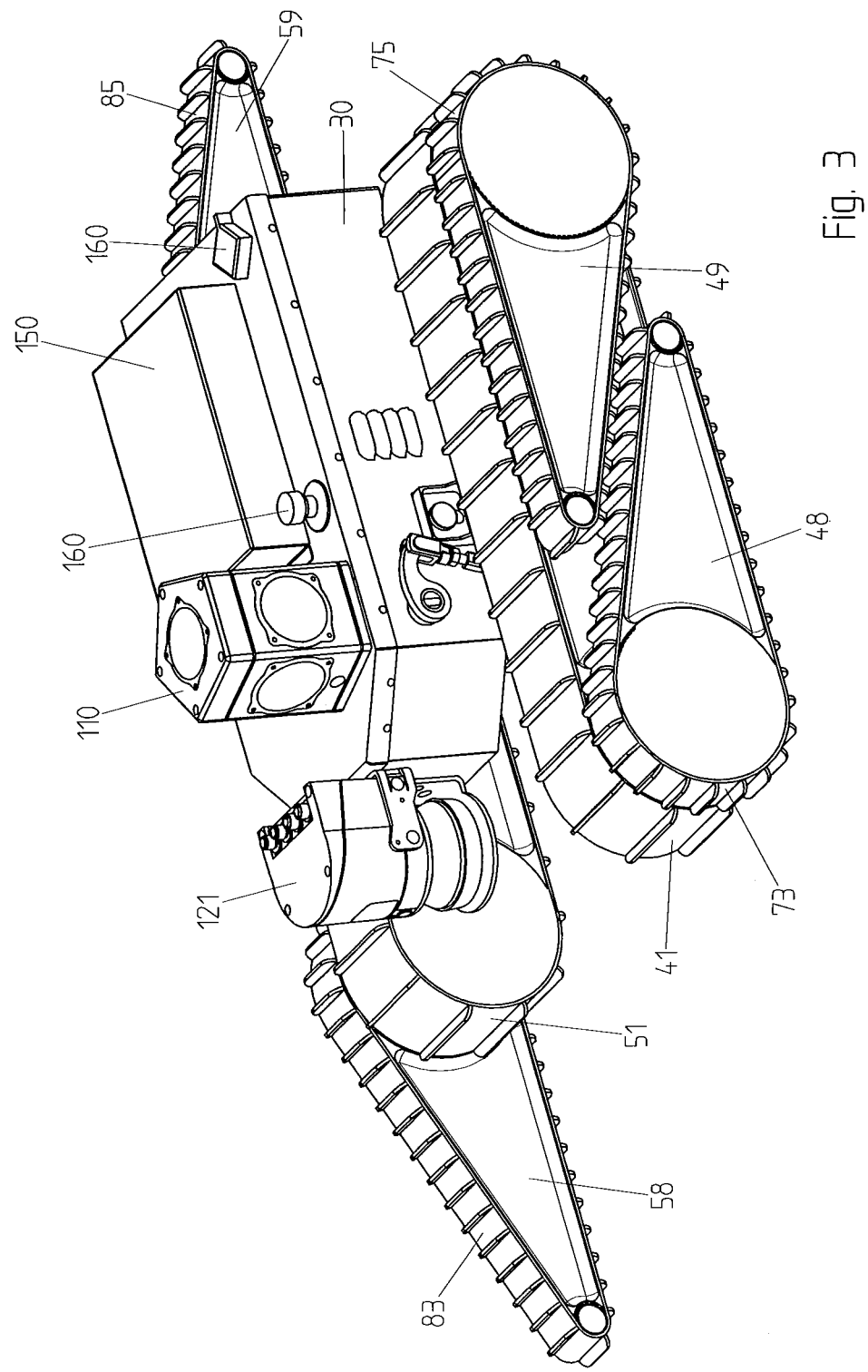
FIG. 3 shows the robot of FIGS. 1 and 2 in perspective, with one pair of flipper fully deployed, on the right side, and one pair of flippers stowed, on the left side.

With reference to FIGS. 1 and 3, the robot of the invention includes a body 30 that contains the onboard electronics and an autonomous alimentation system, for example a pack of LiPo batteries 150, and preferably carries a number of sensors. The figures represent a omni-directional camera 110, a GNSS localization receiver 160, a 3D laser scanner 121 and an inertial measurement unit (inside the body, not visible in the figure). The robot of the invention could however also include different sensors, like for example a rangefinder, a microphone, thermometers, infrared temperature detector, a pan-zoom-tilt directional camera, or any other sensor, as the mission of the robot may require.

The body 30 may also include actuators, for allowing the robot to interact with the embodiment, even if they are not represented in the figures, for example manipulators, arms, a loudspeaker, or transport any mission-specific payload. Preferably, a safety switch 130 allows to stop the robot at any moment, should the need arise.

The locomotion of the robot of the invention is assured by two independent locomotion units pivotally connected to two lateral opposite sides of the body 30, namely the left bogey 43 and the right bogey 53. The bogey run along the sides of the body 31 in the fore-and-aft direction and are each equipped with wheels 44a, 44b and a continuous track 41, 51 for the locomotion. In possible variants of the invention, the bogeys may be substituted by two locomotion units of different nature, for example two pivoting chassis with wheels.

Figure 2:
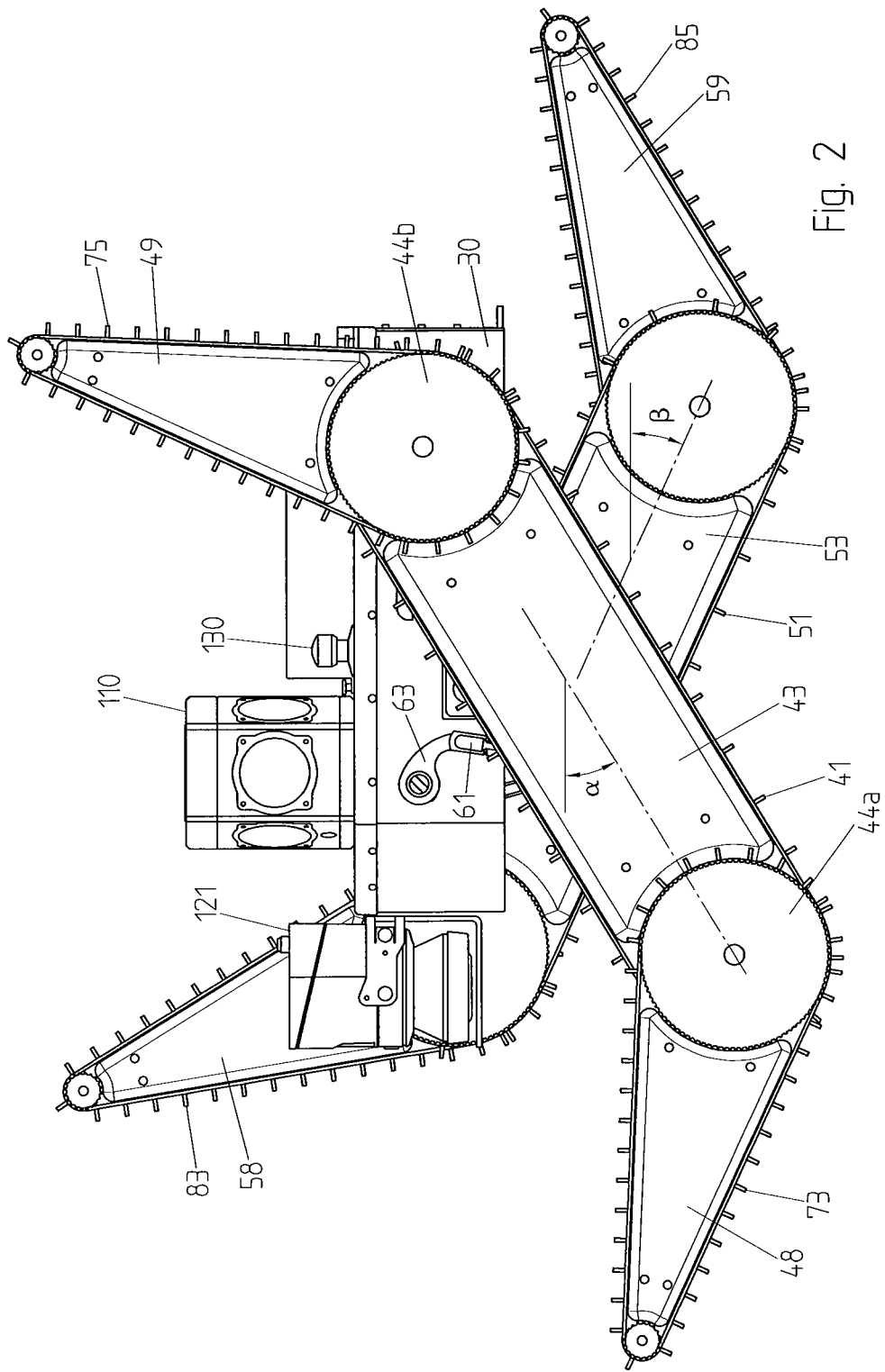
FIG. 2 shows the robot of FIG. 1 with the bogeys inclined, to adapt to a rugged terrain.

The bogeys 43, 53 are not rigidly fixed to the body, but are free to rotate passively about an axis 31 (schematically represented in FIG. 4) transverse to the body, according to the nature of the terrain that the robot is crossing. FIG. 2 shows one such configuration in which the left bogey 43 is rotated downwards (referring to the direction of motion, that is to the left of the figure) of an angle α, while the right bogey 53 is rotated upwards by an angle β. Importantly, the rotation of the bogeys is passive, that is it is not determined by an actuator, but is achieved spontaneously, according to the terrain state. The angles of rotation α and β, however, are not fully unconstrained due to the presence of a transmission system 91 connecting said first and second bogeys 43, 53 and the body 30, in a manner such that the first and second locomotion bogeys 43, 53 rotate in opposite directions and such that the rotation angle (α) of the first bogey 43 relative to the body 39 equates in absolute value the rotation angle (β) of the second bogey 53 unit relative to the same.

This is visible more clearly in FIG. 2. The bogeys open and close like a pair of scissors, with the body 30 always in the middle position. In the represented configuration the left bogey 43 is inclined by an angle α of approximately 30°, while the right bogey 53, in the background is inclined of an angle β equal to α in absolute value but opposite in direction. Advantageously, the body 30 remains horizontal, or at least approximately parallel to the ground.

This feature allows the robot of the invention to adapt passively to a variety of terrain and obstacles, always assuming a configuration that guarantees a sufficient surface of the tracks with the ground, and therefore maximizes the grip.

In a conventional robot with two rigidly connected tracks, the position of equilibrium is over-constrained. On uneven terrain there may be multiple position of equilibrium or quasi-equilibrium and small forces may suffice to wobble the robot, as in a four-legged chair on an uneven floor.

In the robot of the invention, the bogeys are not connected rigidly, but can pivot about a transverse axis. Since the rotation angles of the bogeys are linked by the transmission system 91 a single additional degrees of freedom is introduced. Thanks to this, the robot can adapt passively to uneven terrains, and is steadier.

At the same time, the fact that the body 30 is always in the middle position between the bogeys ensures a sufficient and consistent clearance to ground.

Figure 4:
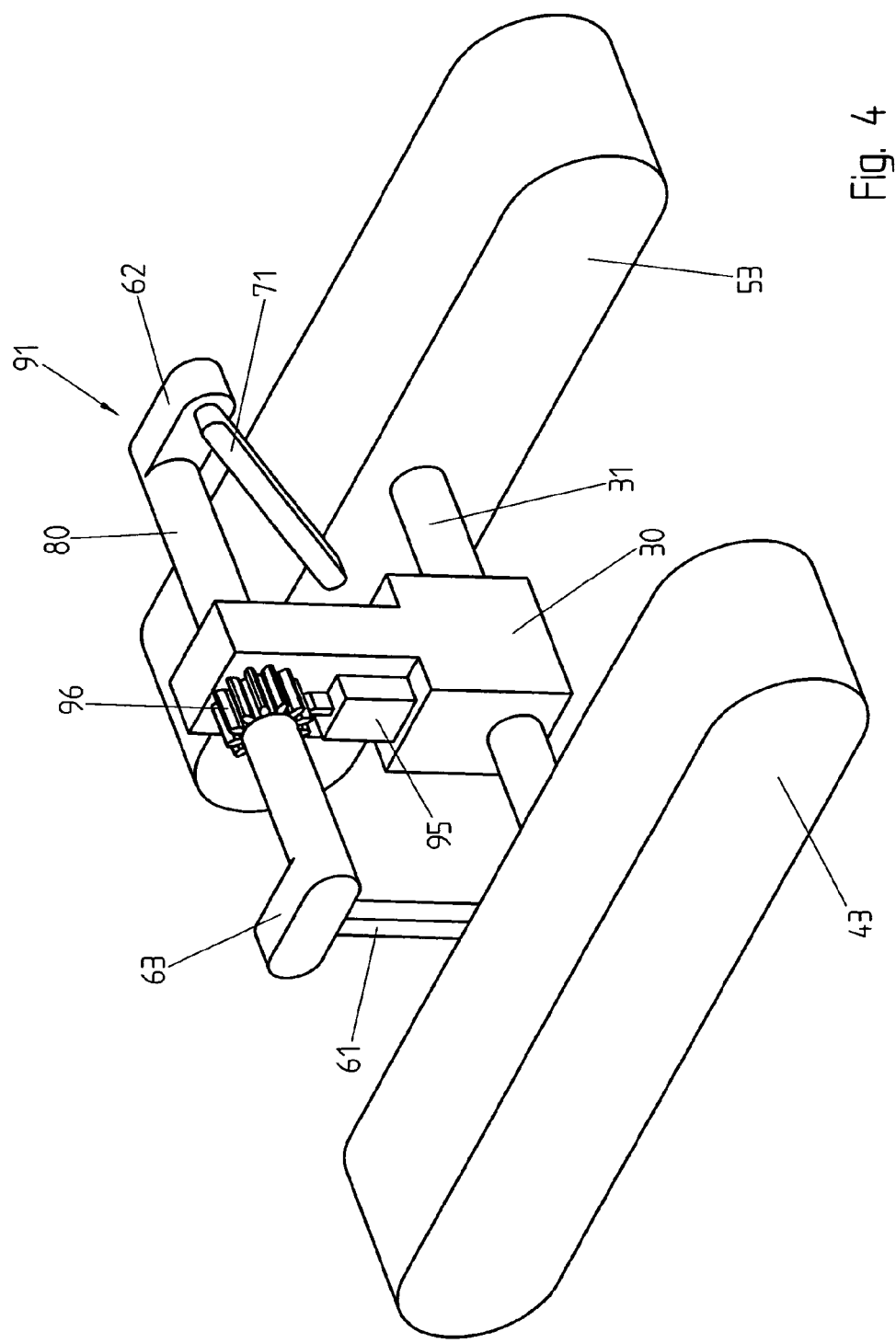
FIG. 4 is a simplified schematic representation of the robot of the invention, illustrating the transmission system that governs the inclination of the bogeys.

The transmission system can be realized in several manners, but preferably by an arrangement as illustrated very schematically in FIG. 4. Two of connection rods 61 link either of the bogeys to a crank 63 or 62 of a shaft 80 that runs parallel to the pivoting axis 31 of the bogeys. The connection rods 61 and 71 are crossed: both are connected to the relative bogeys before the pivot axis, but their cranks points in opposite direction. In this manner one can achieve the desired relation between the angles α and β.

Preferably the robot of the invention includes a brake to prevent the rotation of the shaft 80 and immobilize the angles α and β in any position. This is obtained, in the example, by the actuator 95 that urges against the sprocket 96, but it must be understood that the invention includes all manners of actuators arranged to lock the transmission system (91) thereby fixing the rotation angles α, β.

The arrangement illustrated by the FIG. 4 is not the only possibility for realizing a transmission system that maintains the angles α and β equal, and the invention could also envision other kind of transmission, for example a gear transmission, a belt transmission, or a servo coupling, according to the needs.

Preferably each of the bogeys in the robot of the invention has two flippers 48, 49, 58, 59 pivotally connected at opposite extremities of the bogey. The flippers can be rotated relative to the bogeys by appropriate electric motors or any suitable servo-system. FIG. 3 shows the flippers 58, 59 of the right bogey in the fully deployed configuration, and the flippers 48, 49 of the left bogey in a stowed configuration that is not used in operation, but is advantageous for storage and transport of the robot. FIGS. 1 and 2 show the flipper in an intermediate configuration inclined upwards by approximately 45° that is suitable for uneven terrains.

The flippers have their own tracks 73, 75, 83, 85, which are preferably driven by together with the wheels or by the main tracks of the bogey to which the flippers are connected.

FIG. 5 is a simplified representation of a section of one bogey along the plane A-A of FIG. 1, showing one wheel 44a for the main track 41, and one second wheel 44b for the main track that also includes an electric motor M1 for energizing the main track 41. The flippers 43 and 49 (only partially visible in section) are mounted coaxial with the wheels 44a and 44b include each an electric motor M2, M3 for rotating the flippers, as described above. The bogey also include, preferably electronic controllers 65, 66, 67 for driving the electric motors M1, M2, M3. Advantageously, this disposition limits the connections between the body and the bogeys, allows a compact structure and favours a generous clearance between the body and the ground. Preferably the body has a flat underside with a clearance to ground of at least 10 cm. It is possible to achieve a clearance that is equal or better than 50% of the total height of the mobile robot, which is especially valuable in navigating difficult terrains.

According to a preferred aspect of the invention, the mobile robot includes, in the body, a control unit programmed for autonomous navigation, based on a mission plan and the data received by the on-board sensors. Preferably, the robot has also a communication interface to establish a communication link with a remote control station, over which mission instructions or sensor data can be transmitted. The communication link can be a Wi-Fi connection, or a cellphone interface, or any suitable wireless or wired data link.

REFERENCE NUMBERS 30 body
31 axle
41 bogey's track
43 bogey
44a wheel
44b wheel
48 flipper
49 flipper
51 bogey's track
53 bogey
58 flipper
59 flipper
61 connection rod
63 crank
65 motor driver
66 motor driver
67 motor driver
71 connection rod
73 flipper track
62 crank
75 flipper track
80 shaft
83 flipper track
85 flipper track
91 transmission
95 actuator, brake
96 sprocket
110 omni-directional camera
121 3D scanner 130 emergency button
150 batteries
160 GNSS localization system
M1 track motor
M2 flipper positioning motor
M3 flipper positioning motor

The invention claimed is:

1. Mobile robot comprising a body, a first locomotion unit and a second locomotion unit pivotally connected to two lateral opposite sides of the body and arranged to rotate passively relative to the body about an axis transverse to the body, the mobile robot further comprising a transmission system connecting said first and second locomotion units and the body, characterized in that the mechanical transmission is arranged to limit the relative rotation of the locomotion units relative to the body such that the first and second locomotion units rotate in opposite directions and such that the rotation angle of the first locomotion unit relative to the body equates in absolute value the rotation angle of the second locomotion unit relative to the body, wherein each of the first and second locomotion units consist in an elongated bogey arranged parallel to the body and carrying wheels and/or or a continuous track and each of the bogeys has two flippers pivotally connected at opposite extremities of the bogey and two actuators for actively determining the angle of rotation of the flippers relative to the bogey to which they are connected.

2. The mobile robot of claim 1, further characterized by an actuator allowing to lock the transmission system thereby fixing the rotation angles of the first and second locomotion units relative to the body.

3. The mobile robot of claim 1, in which each of the bogeys includes motors for driving said wheels and/or tracks.

4. The mobile robot of claim 1, the flippers having continuous tracks driven by the wheels or track of the bogey to which they are connected.

5. The mobile robot of claim 3, wherein the bogeys include electronic controllers for piloting the motors for driving said wheels and/or tracks and/or piloting the motors for determining the angle of rotation of said flippers.

6. The mobile robot of claim 1, in which the body has a clearance to ground, on flat terrain, not lower than half of the total height of the mobile robot.

7. The mobile robot of claim 1, in which the body comprises a control unit programmed for autonomous navigation.

8. The mobile robot of claim 1, the body including one or more sensors from:
Pan-Zoom-Tilt camera;
omni-directional camera;
rangefinder;
laser scanner or a laser scanner mounted on a sweeping platform;
GNSS localization system;
thermometer or Infrared temperature sensor;
gas sensor;
microphone;
inertial measurement unit.

9. The mobile robot of claim 1 further comprising a safety switch.

10. The mobile robot of claim 1, in which the transmission comprises a first and a second connection rods connecting the first respectively second locomotion units to a shaft supported in the body and parallel to said axis transverse to the body.

11. Use of the robot of claim 1 in Search and Rescue, or fire fighting, or bomb disposal, or police, or military applications.

* * * * *